Nov. 23, 1926.

M. V. ROSS 1,608,240

HAT BOX

Filed June 15, 1925

Witnesses:
C. E. Wessels.

Inventor:
Minnie V. Ross,
By Joshua R H Polk
her Attorney.

Nov. 23, 1926.
M. V. ROSS
HAT BOX
Filed June 15, 1925    2 Sheets-Sheet 2
1,608,240
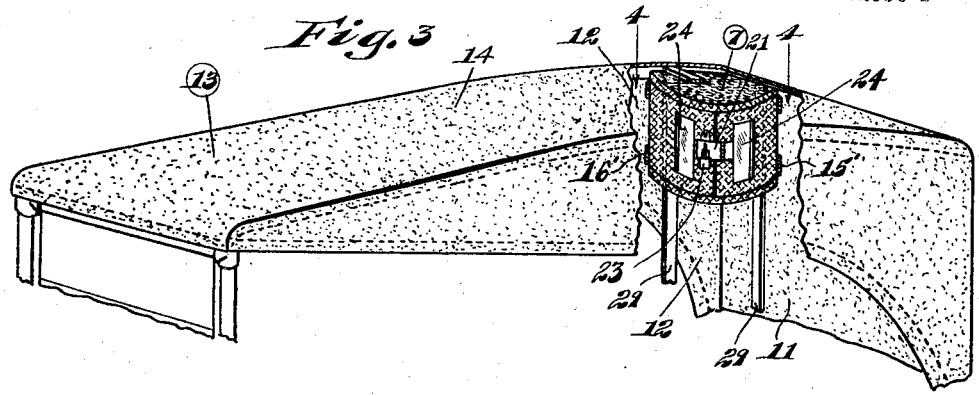
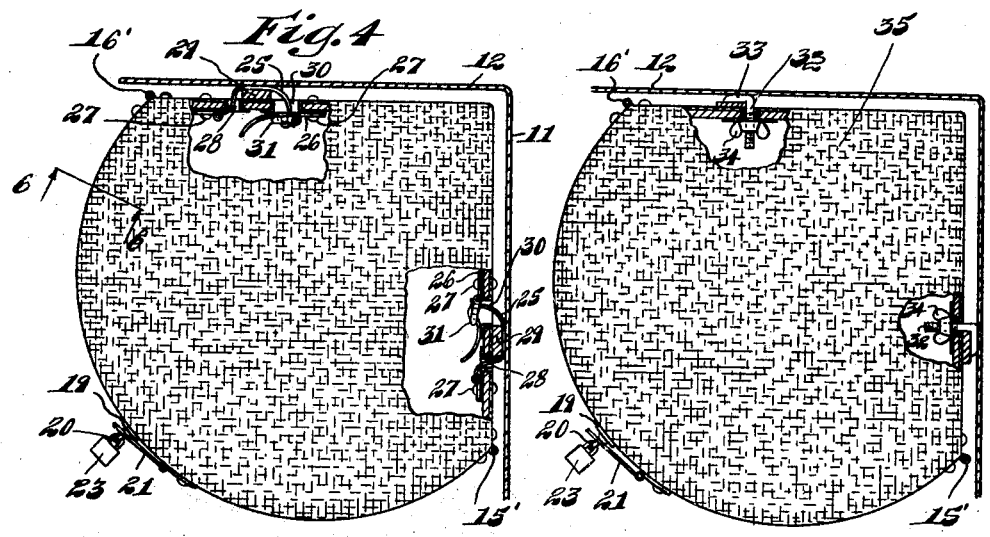
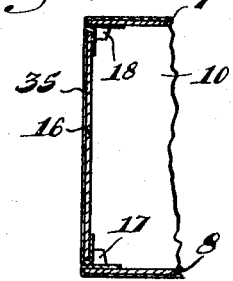
Witnesses:
Inventor:
Minnie V. Ross,
By Joshua R H Potts
her Attorney.

Patented Nov. 23, 1926.

1,608,240

UNITED STATES PATENT OFFICE.

MINNIE V. ROSS, OF JACKSONVILLE, FLORIDA.

HAT BOX.

Application filed June 15, 1925. Serial No. 37,004.

My present invention relates to hat-boxes, especially designed for securement within the tops of motor vehicles where they will be available for holding the hats of women passengers or occupants, and the main object of my invention is the provision of a construction of the character indicated which will embody certain desired features of simplicity, efficiency and convenience and which may be made to have snug fit in an inside corner of the vehicle top where it will not discommode the passengers.

Other objects will appear hereinafter.

The invention consists in the combinations and arrangements of parts hereinafter described and claimed.

The invention will be best understood by reference to the accompanying drawings, forming a part of this specification, and in which, Fig. 1 represents a face view of a hat-box constructed in accordance with my invention;

Fig. 2 represents a horizontal cross section taken approximately on the line 2—2 of Fig. 1;

Fig. 3 is a perspective view of an automobile top, fractionally shown and parts being broken away to illustrate the preferred application of my improved hat-box to an inside corner of the top;

Fig. 4 shows a top plan view of my hat-box, parts being broken away to illustrate the preferred means for securing the box in position on the top;

Fig. 5 is a view similar to that shown in Fig. 4, but illustrating a type of clamping means for securing the box to the top; and Fig. 6 is a sectional detail, taken approximately on the line 6—6 of Fig. 4.

The preferred embodiment of my invention as exemplified in the accompanying drawings, comprises a box-like structure having top and bottom members 7 and 8, held together by back walls 9 and 10 arranged in angular relation as shown, the rear portions or edges of the top and bottom members being also fashioned in angular form to correspond with the back walls. The front portions or edges of the top and bottom members, commencing at the free extremities 9' and 10' of the respective back walls, are curved outwardly, being as shown horizontally convex in form. The purpose of this arrangement is to provide between the top and bottom members an entranceway substantially equal to the overall width of the box structure from the free extremity 9' of one back wall to the free extremity 10' of the other back wall.

By making the box structure in this manner, the angular back portion thereof is adapted to be fitted snugly in an inside corner as 11 produced by the union of the back 11 with the side 12 of an automobile top 13, the box top being preferably positioned immediately underneath the roof 14 of the automobile top.

15 and 16 represent door or closure members which are hinged as at 15' and 16' to the respective extremities 9' and 10' of the back walls. These hingedly engaged doors are adapted, when closed, to fit between the front portions or edges of the top and bottom members, and the same are horizontally convex in form in agreement with the front contour of said top and bottom members. Lugs 17 projecting upwardly from the bottom member and other lugs 18 projecting downwardly from the top member provide suitable stops for the doors when closed. Inasmuch as the box-like structure may also be advantageously used as a place wherein to keep purses, jewelry or other valuables, it is desirable to provide the doors with locking means. To this end, one of the doors, herein shown as 16 may be provided with a keeper 19 having a projecting eye member 20; while the other door may be provided with a catch plate 21 slotted at 22 to slip over the eye member 20, so that the hasp of a lock 23 may be passed through the eye member. The doors 15 and 16 are each preferably provided with a mirror 24 as a convenience for use when hats are to be put on.

In Figs. 2 and 4, I illustrate a preferred form of means for securing the hat-box in horizontally disposed position in the corner of the automobile top. These means comprise straps 25 and 26 which are riveted as at 27 or otherwise secured to the inner faces of the back walls. In the arrangement shown, the longer straps 25 are passed out through apertures 28, around the bars or bows 29 of the automobile top, thence inwardly through apertures 30 for adjustable engagement with suitable buckles 31 carried by the shorter straps 26. In Fig. 5, I illustrate another mode of securing the box-like structure to the automobile top. Here the back walls are each provided with a clamping member 32 having a hook portion 33 adapted to engage over the bar or bow, and having also at the inner side of the box a wing nut 34 for effecting the securement.

My improved hat-box may be made of metal, wire, leather or other suitable material. When made of metal or wire, it is preferably provided with a covering 35 of suitable material harmonizing with the interior finish or lining of the automobile top. When the box is made of leather, the leather employed for the purpose may likewise be of a character that will harmonize with either the upholstering of the car or the lining of the top.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A hat-box of the class described including back walls meeting along a line to provide a single back corner adapted to fit the corner of an automobile body; top and bottom members connecting said back walls and having extensions increasing the capacity of the hat box and extending well beyond the front ends of the back walls; and door means arranged to close the space between the front ends of said back walls and the extensions on said top and bottom members, substantially as described.

2. A hat-box of the class described including back walls meeting along a line to provide a single back corner adapted to fit the corner of an automobile body; top and bottom members connecting said back walls and formed with extensions increasing the capacity of the hat box well beyond the front ends of the back walls; and a pair of door members hinged along one edge to the front ends of said back walls jointly comprising the front of the structure, substantially as described.

3. A hat-box of the class described including back walls meeting along a line to provide a single back corner adapted to fit the corner of an automobile body; top and bottom members connecting said back walls and formed with extensions increasing the capacity of the hat box well beyond the front ends of the back walls; door means arranged to swing between said top and bottom members and comprising the front of the structure; and stops for the door means set inwardly of the front edges of the extensions on said top and bottom members, substantially as described.

4. A hat-box of the class described including back walls meeting along a line to provide a single back corner and connected by top and bottom members; and means associated with said back walls for securing the box structure to the top of a motor vehicle with the single back corner fitting an inside corner of the top of the vehicle, substantially as described.

5. A hat-box of the class described including back walls meeting along a line to provide a single back corner and connected by top and bottom members; there being openings in said back walls; and means arranged to be taken through said openings and to be secured on the inside of the box for attaching said back walls to the top of the motor vehicle with said single back corner fitting a corner of the top of the vehicle, substantially as described.

6. A hat-box of the class described including back walls meeting along a line to provide a single back corner and connected by top and bottom members; there being openings in said back walls; fastening members associated with the back walls for attaching the box to the top of a motor vehicle with said single back corner fitting an inside corner of the top of the vehicle, said fastening members being enterable through said openings; and means for securing the fastening members inside the box, substantially as described.

In testimony whereof I have signed my name to this specification.

MINNIE V. ROSS.